Sept. 26, 1967  E. C. LOWE  3,343,920
FURNACE FOR MAKING SILICON CARBIDE CRYSTALS
Filed Jan. 11, 1966  4 Sheets-Sheet 3

INVENTOR
EDWIN C. LOWE
BY
ATTORNEYS

INVENTOR
Edwin C. Lowe

United States Patent Office 3,343,920
Patented Sept. 26, 1967

3,343,920
FURNACE FOR MAKING SILICON
CARBIDE CRYSTALS
Edwin C. Lowe, Chippawa, Ontario, Canada, assignor to
Norton Company, Worcester, Mass., a corporation of
Massachusetts
Filed Jan. 11, 1966, Ser. No. 519,943
2 Claims. (Cl. 23—277)

This application is a continuation-in-part of my copending application Ser. No. 131,708, filed Aug. 8, 1961, (now abandoned) which is a division of my application Ser. No. 784,791, filed Jan. 2, 1959, now Patent No. 3,025,192.

The invention relates to silicon carbide crystals and processes and furnaces for making them.

One object of the invention is to produce crystals of silicon carbide containing total impurities not greater than several hundred p.p.m. (parts per million) and having a specific electrical resistance at room temperature in the range from 0.05 to 1000 ohms cm. Another object of the invention is to produce crystals for the manufacture of rectifiers especially for use at high temperatures. Another object of the invention is to produce crystals for use as transistors especially for use at high temperatures. Another object is to produce thin plate-like crystals of silicon carbide with parallel faces, transparent or translucent and free of inclusions or other physical defects.

Another object is to produce silicon carbide crystals of n-type conductivity. Another object is to produce silicon carbide crystals of p-type conductivity. Another object is to provide components for the manufacture of rectifiers and transistors which require sometimes crystals of n-type conductivity and at other times require crystals of p-type conductivity. Another object is to provide processes for making silicon carbide crystals of n-type conductivity of varying value. Another object of the invention is to provide processes for making silicon carbide crystals of p-type conductivity of varying value. Another object is to achieve the last two objects while limiting the specific electrical resistance (resistivity) at room temperature to the range of 0.002 to 1000 ohms cm.

Another object of the invention is to provide new tools for use in research on semi-conducting materials for the development of electronic devices. Another object is to provide a material useful as in the preceding object which will withstand higher temperatures than materials heretofore generally used. Another object is to produce silicon carbide crystals for use in electronic apparatus out of low cost raw material. Another object is to provide processes for the production of silicon carbide crystals of the type indicated which are flexible in use and susceptible to careful control. Another object is to provide crystals of silicon carbide of hexagonal form of large sizes and high purity. Another object is to produce such crystals and others of silicon carbide in the narrow range of 1–10 ohms cm. and in other narrow ranges also for the productioon of useful electronic devices and for research.

Another object is to provide parallel face articles to compete to advantage with thin plates of germanium, silicon and other materials for use in electronic devices such as rectifiers and transistors. Another object is to provide such articles which can withstand higher temperature than germanium and silicon in use. Another object is to produce crystals for use in transistors, rectifiers and other electronic devices which can readily be soldered to metal wires for the manufacture of such devices. Another object is to produce silicon carbide crystals having both n-type and p-type conductivity in different parts thereof with a p-n junction between them.

Another object is to provide a simple furnace for the production of these crystals. Another object is to provide a furnace construction for various requirements in manufacturing to produce silicon carbide crystals of different parameters including sizes, resistivity, conductivity, n or p as desired. Another object is to provide a furnace readily permitting the adidtion of desired elements into the silicon carbide to control the properties of the crystals. Another object is to provide a furnace wherein a temperature gradient can be established and controlled. Another object is to provide a furnace with facilities for controlling the atmosphere therein and for changing the atmosphere as desired. Other objects are to provide processes carrying out various objects specified for the furnaces, that is to say to achieve the controls herein stated whether the specific improvement be classified as involving a process or an apparatus. Another object is to provide large size silicon carbide crystals with parallel faces and of very high purity and also, when desired, to add thereto other elements in controlled amounts to produce different kinds of crystals for electronic and other uses. Another object is to provide a process and an apparatus for producing these crystals in such a condition relative to the matrix material that they can readily be separated from it. Another object is to produce these crystals at lower temperatures than those at which silicon carbide crystals of the type described have been heretofore produced. Another object is to provide processes which are economical of the furnace and its parts. Another object is to provide processes which require less power than heretofore.

Other objects will be in part obvious or in part pointed out hereinafter.

In the accompanying drawings illustrating typical apparatus for making the crystals and for carrying out the processes and as embodiments of furnaces according to the invention, FIGURE 1 is a vertical sectional view of a furnace according to the invention;

Figure 1:
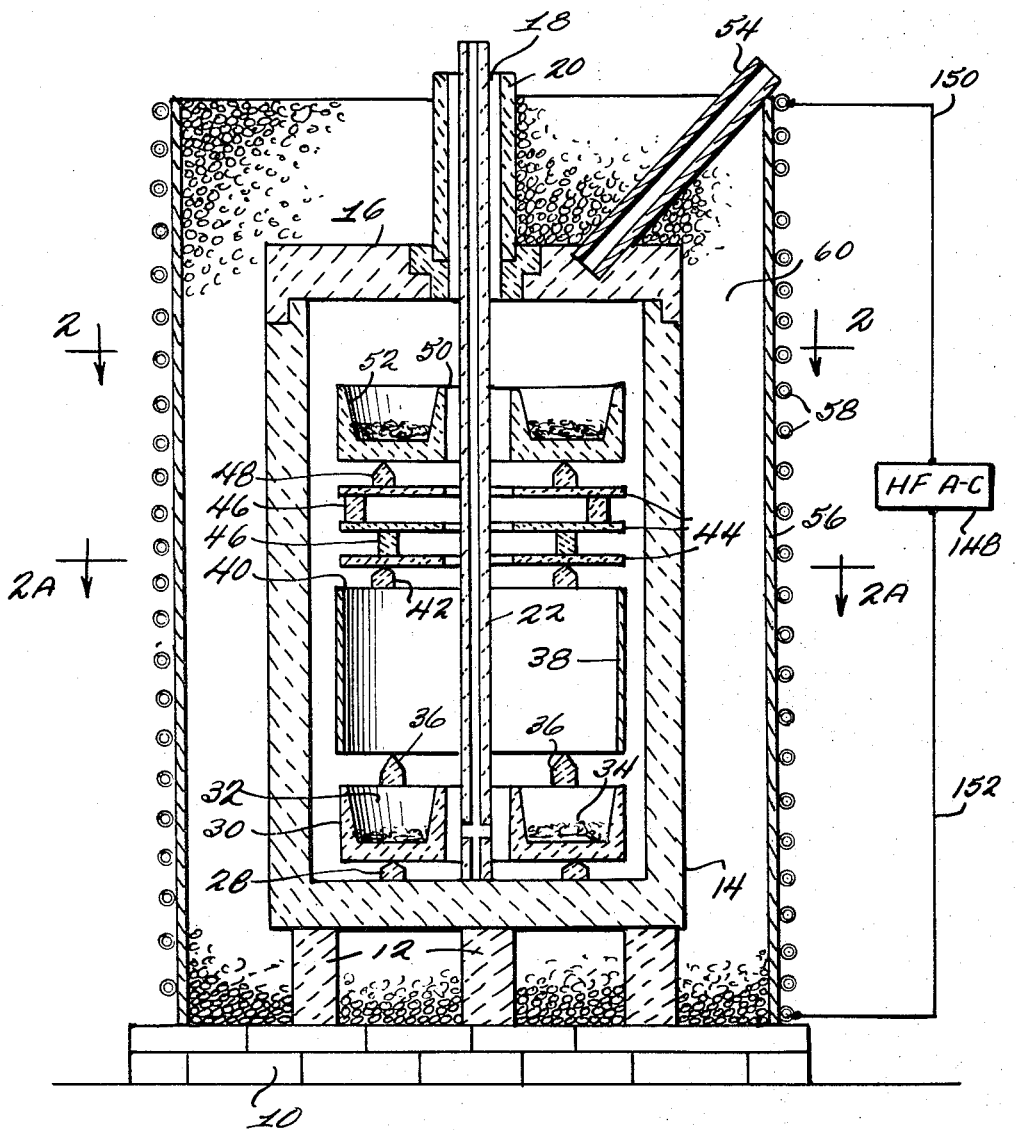

Modern solid state rectifiers operate by virtue of the presence of p-n junctions. A crystal of germanium or silicon is doped in such a way that one part contains an electron donor, making it an n-type conductor, while the remainder contains an electron acceptor, making it a p-type conductor. The junction between the two regions, the so-called p-n junction, conducts electricity in one direction only and therefore acts as a rectifier. Transistors are somewhat similar, the most common type consisting of three regions in a single crystal, which may be two p regions separated by an n region (PNP type) or two n regions separated by a p region (NPN type). All these devices depend for their operation on reliable control of the type and amount of conduction in the various regions of the crystal noted above. This control is possible only if the pure crystal is substantially non-conducting, i.e., the conductivity must come from the added impurity and not be intrinsic to the lattice of the crystal itself. In general all crystals start to conduct intrinsically at a high enough temperature, and the principal consideration that determines the maximum allowable temperature is the energy gap. This figure, usually measured in electron volts, is the energy required to free an electron from a covalent bond in the particular material concerned and make it available for conduction. The energy gap for Ge is about 0.7 electron volt, that for Si is about 1.1 electron volts, while the figure for SiC has been estimated at nearly 3.0 electron volts. As a result of this fact, germanium devices cannot be used about 100° C. at the most. Si goes up to about 200° C., while SiC has been used experimentally about 600° C. and the upper limit is not yet known. Both theory and the experimental data that have been made public to date indicate that the temperature limit for SiC is far above that of the materials that are in commercial use at present in semiconducting devices.

In these rectifiers, one region is the crystal itself as made which therefore must be a p-type crystal or an n-type crystal, and the other region is a region of the crystal which has been treated in a known way that doesn't need to be described. In the transistors the situation is similar, the intermediate region being the crystal itself without change which therefore must be n-type or p-type and the other regions having been treated. This type of treatment is known as "doping," and that which is used to dope is called a "doping agent." Also whatever it is in the atmosphere that makes a crystal p-type or n-type is referred to as a "doping agent."

Most materials conduct electricity to some extent and a number of mechanisms have been isolated. For example, practically all metals conduct by virtue of the presence of many free electrons. One of the criteria of metallic bonding is that the electrons are immediately available for conduction and there is no specific increment of energy that must be available to mobilize electrons in the lattice. On the other hand, many materials such as pure Ge, Si and SiC have covalent bonding. The electrons are held in place and can be freed for conduction only by supplying a specific amount of energy, which is quite large for SiC. Such materials can be made into n or p type conductors by the addition of suitable donor (electron providing) or acceptor (electron absorbing) doping agents. Thus, SiC can have either n or p type conductivity imparted to it by doping agents, as will be described. This is done by providing a specific atmosphere during the growth of the crystal, the later doping above explained is done after the crystal has been made in order to make a rectifier or a transistor and is a process with which my invention is not concerned.

The process of the present invention comprises heating elemental silicon to a temperature at which it has an appreciable vapor pressure in the vicinity of or at its boiling point in a carbon enclosure containing suitably arranged carbon surfaces. Generically carbon means ordinary carbon (in the specific sense) and graphite, which is preferred, but ordinary carbon can be used. As a result of a reaction between the silicon vapor and the carbon, large numbers of plate-like silicon carbide crystals grow from the carbon surfaces. On cooling the furnace, the crystals are detached from the surfaces and are collected. They can be easily detached from ordinary carbon or graphite. Sometimes in doing this they are broken but usually this does not matter. The atmosphere in the container may be controlled throughout the heating and cooling cycle to obtain the desired purity in the crystals, or to introduce addition agents during their growth.

I have found that it is necessary to have a temperature gradient in the interior of the heated carbon enclosure because the crystals will grow properly from the carbon surfaces only down a temperature gradient. Since the wall of the enclosure constitutes the source of heat, being heated by induction, the temperature gradient is usually from the hot wall to the somewhat cooler surfaces that face inward. The outward-facing surfaces become covered with a coating of silicon carbide, but no large crystals are formed. Large crystals can also grow on cooler, generally upwardly facing surfaces which are positioned substantially parallel to the surface of the boiling silicon.

Since the cylindrical wall of the container is generally a source of heat, temperature gradients are determined by the placement of the graphite crystal-growing surfaces, and the use of heat sinks, such as a central gas vent. The evaporating silicon provides an excellent heat sink.

Figure 2:
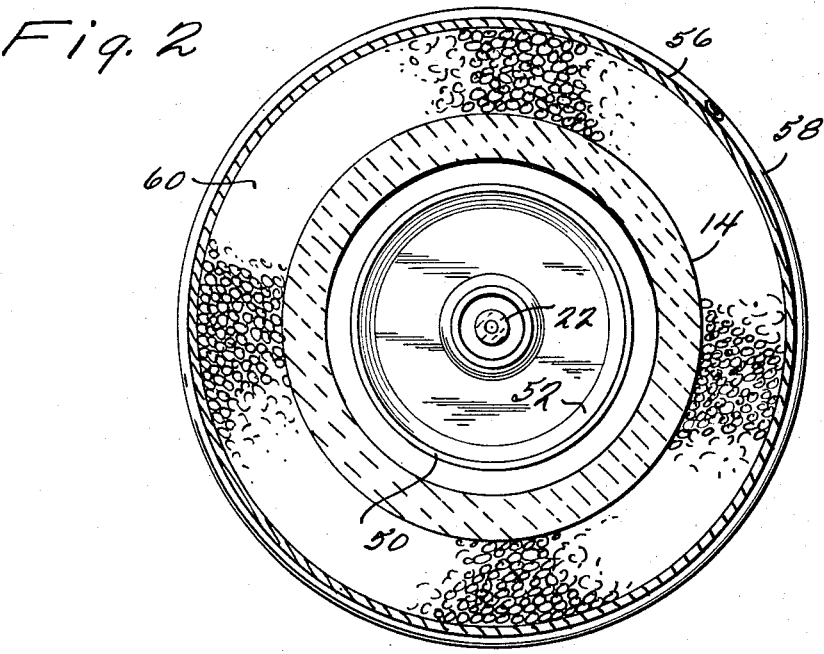
FIGURES 2 and 2A are cross sectional views taken respectively on lines 2—2 and 2A—2A of FIGURE 1.
Figure 2A:
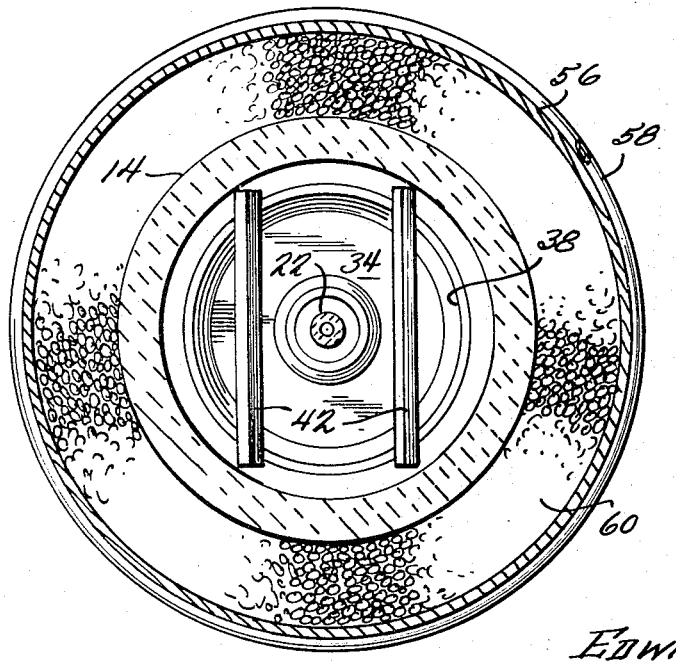

Referring now to FIGURES 1 and 2, a fire brick base 10 supports graphite blocks 12 which support a graphite container 14 having a graphite cover 16 with a central hole 18 the top of which is counter-bored to receive a graphite chimney 20. Extending through a vertical axial bore in the chimney 20 is a graphite tube 22 to lead any desired gas to the container 14. On the bottom of the container 14 are graphite supporting bars 28 supporting a ring-shaped graphite crucible 30 which has an annular trough 32 that may be of the shape shown or any other convenient shape into which is charged a quantity of silicon 34 such as in the form of lumps. I prefer to use and believe that the best results can be achieved by using relatively pure silicon and that which I have used with highly satisfactory results had less than 5 parts per million total impurities.

Although my furnace was heated inductively with high frequency alternating current, employing graphite as the electrical receptor, I can achieve the same general results by electrical resistance heating employing a graphite tube as the resistor by methods and apparatus details well known in the electric furnace art.

Supported by the graphite crucible 30 are graphite bars 36 upon which rest a cylindrical graphite sleeve (thin walled hollow cylinder) 38. Crystals grow upon the inside of this sleeve. Supported by the upper peripheral edge 40 of the graphite sleeve 38 are graphite bars 42 which support horizontal graphite plate 44 which in turn supports graphite bars 46. Supported on graphite bars 46 is a second horizontal graphite plate 44 on which is supported a second set of graphite bars 46. The second set of graphite bars support a third horizontal graphite plate 44 on which is supported graphite bars 48 which support a second ring shaped graphite crucible 50 which has an annular trough 52 which like crucible 30 can be charged with silicon. By induction the vertical cylindrical wall of the crucible 14 receives the heat and by conduction the bottom of the crucilbe 14 loses heat downwardly and the chimney 20 and a hole 18 lose heat upwardly. There is therefore a temperature gradient which causes heat to flow from 38 to 22 i.e., a gradient of dropping temperature from the inside of graphite sleeve 38 to the center of the apparatus and to its ends. There is also a temperature gradient from the bottom surface of the lowermost horizontal graphite plate 44 the one above and from the top surface of the uppermost plate 44 to the top 16 of the crucible 14, i.e., a gradient showing a dropping temperature range from the upper surface of each horizontal graphite plate 44 to the top of the apparatus. It is the heat flow along these decreasing temperature gradients which promotes the crystal growth. Furthermore, although the temperature may be fairly closely controlled as indicated by observations made by an optical pyrometer through graphite tube 54, conditions vary enough so that somewhere along the over-all temperature gradient which decreases progressively from cylinder 38 to tube 22 and upwardly from the lowermost to the highest horizontal graphite plate gives a chance for very good crystal growth on the inside of the sleeve and the top surface of the horizontal graphite plates and also different sizes and thicknesses of crystals on these surfaces which results in the manufacture of crystals of various kinds and sizes to make a diversified product to meet the demands of industry.

In the furnace described herein, heat sinks are provided by the presence of relatively cool surfaces and/or heat absorbing means spacedly removed from a heat source, said heat-sinks preferably being disposed to effect movement of heat radially inwardly from the periphery of the chamber and then normal to the radial inflow pattern through said carbon surfaces. Said heat-sinks take the form of a heat conveying structure that permits a controlled leakage of heat through the supporting fire brick under the furnace, the controlled flow of heat through chimney 20, the flow of heat to crucibles 30 and 50 in FIGURE 1 for example to vaporize the silicon, and sometimes the flow of heat to an incoming gas being fed into the furnace through tube 22.

The present belief is that the growth of plate-like crystals is accomplished by this structural and thermal relationship of the component parts of the furnace. Thus, there is a predetermined controlled heat movement and temperature relationship throughout the structure such that heat flows in one path from the vertical side walls of the container 14, through the cylindrical sleeve 38, crucible 30, and to the bottom of the container 14. The vertical side walls of the container are generally parallel to the cylindrical sleeve 38 and these elements are sufficiently spacedly removed from each other so that there exists a decreasing temperature gradient measured from the vertical side walls of the container to the cylindrical sleeve and thence to the bottom of said container. Heat flows in another path in a controlled manner along a decreasing temperature gradient from the side wall of the container, through cylindrical sleeve 38, upwardly through plates 44 to crucible 50, chimney 20 and top 16, whereby to establish a structural and thermal relationship.

In the apparatus shown in FIGURE 1, the structural and thermal relationship between that component part of the furnace adapted to be maintained at a relatively high temperature and that component part of the furnace adapted to be maintained at a lower temperature is such that the former is substantially transverse to the latter whereby the pattern of heat flow established is generally radially inwardly into the furnace initially, and then axially outwardly whereby the heat passes away from the carbon surfaces upon which the crystals grow, in a direction at a right angle with respect to said surface.

Resting on the fire brick base 10 ouside of the container 14 is a cylindrical asbestos sleeve 56 outside of which is the induction coil 58 energized by high frequency electric energy, and induction furnaces are now so well known that I do not need to describe this water cooled coil 58 nor the frequency or electromotive force, current, power and the like by which it is energized as these matters are well understood in the art. The space between the sleeve 56 and the container 14 and under the contoner 14 and over the cover 16 is filled with carbon black insulating grain 60. Any other insulating material such as zirconia grain which can satisfactorily meet the requirements can be used.

To grow crystals in accordance with the invention, the crucibles 30 and 50 were each charged with three and five pounds of silicon respectively and the temperature of the cover 16 as measured by the optical pyrometer was raised to 2480° C. in 3 hours and it was maintained between 2480° C. and 2485° C. for an additional 5 hours. Then the furnace was allowed to cool and the top insulation and graphite cover 16 were removed. A large number of transparent plate-like crystals of silicon carbide up to ½ of an inch across and from very light to dark green in color were found on the inner surfaces of the sleeve 38 and the upper surfaces of the horizontal plates 44. On the outside of the sleeve and on the undersides of the horizontal plates 44 a smooth, finely crystalline coating of silicon carbide had formed. Stripping the crystals off of the relatively soft graphite was not a difficult job. It will be seen that the sleeve 38 and the horizontal plates 44 are completely independent of each other mechanically and therefore there is easy access to the crystals on the inside of the sleeve and on the upper surface of the horizontal graphite plates.

Provided the silicon vapor has access to the graphite surfaces upon which the crystals are to grow and provided the temperature gradients are maintained, the dimensions of the furnace are not critical, but as illustrating the embodiment of FIGURES 1 and 2, the outside diameter of the sleeve 38 was 16 inches, the thickness of the horizontal plates 44 was 0.5 inch and the rest of the furnace was in proportion as shown in the drawing.

The crystal growth on the sleeve 38 which can also be called a cylinder, was chiefly at the top and bottom thirds of the areas, on the inside as stated. The middle third didn't grow many crystals. The crystal grown on the horizontal plates 44 was chiefly at the inside and outside thirds of the area on the upper surface thereof, as stated. In each place where the crystals grew there was a decreasing heat gradient in the direction of the growth of the crystals. All the crystals grew normal to the surfaces on which they were formed. They grow in a manner such that the side faces of the crystals are parallel. Some of the crystals that I have made have been as thin as 1 mil and some of these are truly flexible but very delicate. Others have been as thick as 100 mils or more.

In this particular run crystals were up to one-half an inch in longest dimension but many were as small as one-quarter of an inch in dimension and some were smaller, but most of them showed the typical crystal angle of silicon carbide of 120°. This angle is usually found at the junction of the edges opposite the surface on which the crystal grew.

The apparatus of FIGURES 1 and 2 can be operated with various atmospheres. For example, by flowing a gas into the furnace through the refractory pipe 22 concentric with the chimney 20 as shown in FIGURE 1, or tube 118 in FIGURE 5, and connecting such means to pipe outside of the furnace leading to a source of gas under pressure, almost any gas can be introduced into the furnace, meaning the space inside of the container. If argon is so run into the furnace starting before high temperatures have been reached, the nitrogen is mostly eliminated and other gases are eliminated and quite pure silicon carbide crystals are produced. By leaving a little nitrogen in the atmosphere the n-type crystals are produced. Similarly phosphorus and arsenic produce n-type crystals and to provide phosphorus as a doping agent, phosphorus trichloride or phosphorus hydride can be used, and to provide arsenic as a doping agent arsenic trichloride can be used. Likewise antimony trichloride can be used as a donor doping agent which produces n-type crystals.

Boron and aluminum as doping agents produce p-type crystals. To add boron, its trichloride can be added to the atmosphere in the manner above indicated and to add aluminum, its trichloride also can be used. These gaseous compounds are best added with a flow of inert gas such as argon or helium, but because argon has a much higher specific gravity, I prefer it to helium and the other inert gases which are more expensive.

Several hundred crystals were produced in this particular run wherein argon was used to purge the furnace of air prior to the start of the run. Even with a thorough purging step some residual nitrogen from the air cannot be removed and I have found that my crystals contained a fair amount of nitrogen, the exact amount of which I did not determine but I estimated at several hundred parts per million. The conductance of the few crystals I tested was high, resistivity low (of the order of .05 ohm cm.) and they were of good size and quality.

As the apparatus in FIGURE 1 is used, the cylindrical wall of the graphite container 14 is oxidized on the outside and it is not always convenient to ascertain how much of the wall has thereby been consumed. This cylindrical wall of the container 14 when it is new absorbs practically all of the electromagnetic field, but when it is thin, this field releases more energy in the sleeve 38 as compared with the wall of container 14 and also energy is utilized in the crucibles 30 and 50 to vaporize the silicon metal. The fact that sometimes under these circumstances the crystals grow on the outside of the sleeve 38 when taken in connection with the fact that then more of the heat was developed in the sleeve than in the wall and that normally crystals grow on the inside of sleeve 38 because there is a definite heat sink at the axis of the furnace, tends to prove my theory that the crystals grow on a carbon surface which faces towards a downwardly directed temperature gradient.

The foregoing description constitutes one example of the invention as to the process and the apparatus. Typical variations to produce specific results have been indicated.

Figure 3:
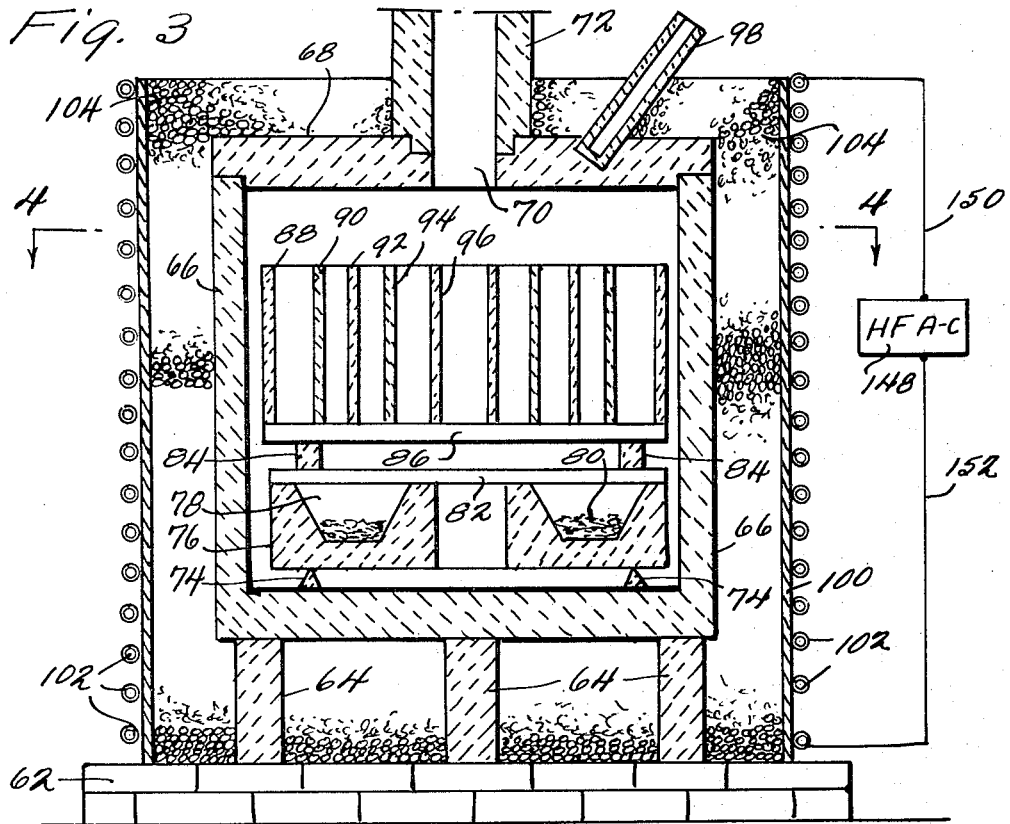
FIGURE 3 is a vertical sectional view of another furnace according to the invention.
Figure 4:
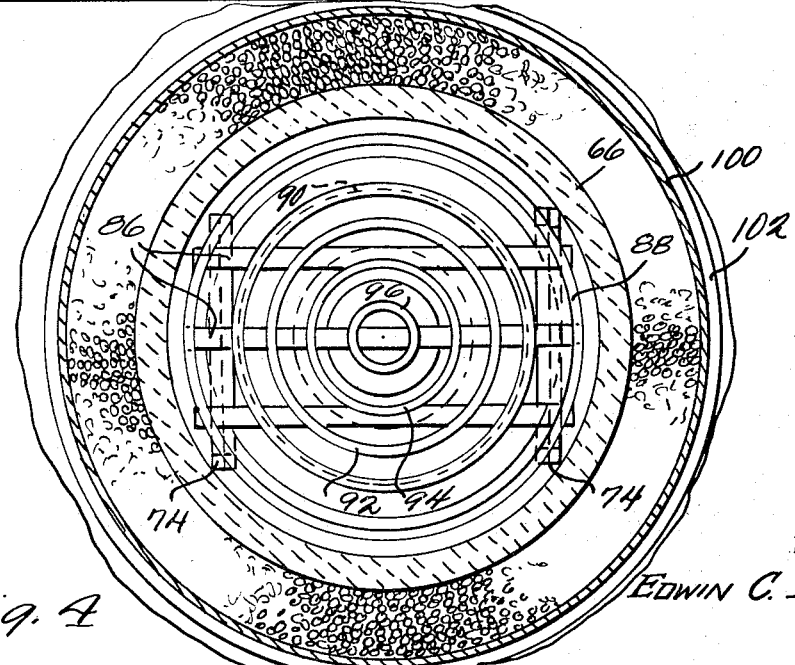
FIGURE 4 is a horizontal cross sectional view taken on the line 4—4 of FIGURE 3.

Another embodiment of the invention is illustrated in FIGURES 3 and 4 where there is shown a fire brick base 62 which supports graphite blocks 64 which in turn support a graphite container 66 having a graphite cover 68 with a central hole 70 the top of which is counterbored to receive a graphite chimney 72. On the bottom of the container 66 are graphite supporting bars 74 supporting a ring-shaped graphite crucible 76 which has an annular trough 78 that may be of the shape shown or any other convenient shape into which is charged a quantity of silicon 80 such as in the form of lumps. Although I believe that the best results can be achieved using purer silicon, that which I have had and used with highly satisfactory results analyzed silicon, 97.39%; aluminum, 1.21%; iron, 0.90%.

This embodiment of the furnace was heated in essentially the same manner outlined in describing FIGURES 1 and 2.

Supported by the graphite crucible 76 are graphite bars 82 which support graphite bars 84 which support graphite bars 86 upon which rest cylindrical graphite sleeves (thin walled hollow cylinders) 88, 90, 92, 94 and 96. It is upon the insides of these sleeves that the crystals grow. By induction the vertical cylindrical wall of the container 66 receives the heat and by conduction the bottom of the container 66 loses heat downwardly and the chimney 72 and hole 70 lose heat upwardly. Also heat flows to crucible 76 to vaporize the silicon 80. There is therefore a temperature gradient from 88 to 96 and there is a gradient of dropping temperature from the inside of each graphite sleeve to the next one and towards the top and bottom walls of the furnace and from the sleeve 96 to chimney 72 and crucible 76 through the center of the apparatus. It is this heat flow which produces the temperature gradient which in turn promotes the crystal growth. Furthermore, although the temperature may be fairly closely controlled as indicated by pyrometric graphite tube 98, conditions vary enough so that the over-all temperature gradient through the successive cylinders 88 to 96 gives a chance for very good crystal growth on the inside of at least one and sometimes more of the sleeves and also different sizes and thicknesses of crystals on the insides of the various sleeves which results in the manufacture of crytals of various kinds and sizes to make a diversified product to meet the demands of industry.

Resting on the fire brick base 62 outside of the container 66 is a cylindrical asbestos sleeve 100 outside of which is the induction coil 102 which are essentially the same as those described in FIGURES 1 and 2. Again the space between the sleeve 100 and the container 66 and under the container 66 and over the cover is filled with zirconia insulating grain 104 for essentially the same reason as hereinbefore described.

To grow crystals in accordance with this embodiment of the invention, the crucible 76 was charged with fourteen pounds of silicon and the temperature of the cover 68 as measured by the optical pyrometer utilizing tube 98 was raised to 2400° C. in 3½ hours and it was maintained between 2390° C. and 2410° C. for an additional 4 hours. Then the furnace was allowed to cool and the top insulation and graphite cover 68 were removed. A large number of transparent platelike crystals of silicon carbide up to ¾ of an inch across and from very light to dark green in color were found on the inner surfaces of all of the coaxial sleeves 88–96 inclusive. The sleeves 88, 90 and 92 had the most crystals of the larger sizes. On the outsides of the sleeves a smooth, finely crystalline coating of silicon carbide had formed. Some crystals did grow on the inside of the sleeves 94 and 96. Stripping the crystals off of the relatively soft graphite was not a difficult job. It will be seen that the sleeves 88–96 are completely independent of each other mechanically and therefore there is easy access to the crystals on the insides of the sleeves.

Again, provided the silicone vapor has access to the graphite surfaces upon which the crystals are to grow and provided the temperature gradients are maintained, the dimensions of the furnace are not critical, but as illustrating the embodiment of FIGURES 3 and 4, the diameter of the sleeve 88 was twenty-four inches, of the sleeve 90 was eighteen inches, of the sleeve 92 was fourteen inches, of the sleeve 94 was nine inches and of the sleeve 96 was four inches, all of these being outside diameters, and the rest of the furnace was in proportion as shown in the drawing.

The crystal growth on the sleeves 88, 90 and 92, which can also be called cylinders, was chiefly at the top and bottom thirds of the areas, on the inside as stated. Not many crystals grew in the middle third area of these cylinders. The crystals also grew on the underside of the bars 86, in fact the largest crystals were found there. They also grew on the underside of the bars 82. In each place where the crystals grew there was a decreasing heat gradient in the direction of the growth of the crystals. All the crystals grew normal to the surfaces in which they were formed. Some of the crystals that I have made have been as thin as 1 mil and some of these are truly flexible but very delicate. Others have been as thick as 100 mils or more.

In this particular run crystals were up to three-quarters of an inch in longest dimension but many were as small as one-quarter of an inch in diameter and some were smaller, but most of them showed the typical angle of silicone carbide of 120°. This angle is usually found at the junction of the edges opposite the surface on which the crystal grew.

The atmosphere in the furnace was originally air but the oxygen of the air was soon exhausted by combining with the carbon of the graphite to form CO and so then the atmosphere became carbon monoxide and nitrogen. The nitrogen definitely affected the crystals, entering into them as an electron donor in the silicon carbide and producing n-type crystals. Several thousand crystals were produced in this particular run. They contained a large amount of nitrogen as indicated by the fact that the conductance of the few crystals tested was high and the resistivity was low (of the order of .002 ohm cm.). The exact amount of nitrogen was not determined.

The apparatus of FIGURES 3 and 4 can be operated with other atmospheres as heretofore described with respect to FIGURES 1 and 2.

As the apparatus is used, the cylindrical wall of the graphite container 66 is oxidized on the outside and it is not always convenient to ascertain how much of the wall has thereby been consumed. This cylindrical wall of the container 66 when it is new absorbs practically all of the electromagnetic field, but when it is thin, this field releases energy in the sleeves 88–96 and also in the crucible 76. On occasions I have found that the heat gradient was reversed and crystals began to grow on the outside of some of the sleeves 88–96. For better control of the process and to stop this phenomenon, the sleeves 88–96 can be slotted vertically which breaks the circuit in the element in which a current flow would otherwise be induced, and then they absorb little of the energy of the electromagnetic field. By slotting I mean that the circle of the sleeves is broken and it should be broken in such a way that the bars 86 do not complete the circuit. The fact that sometimes the crystals grow on the outside of some of the sleeves when the sleeves are not slotted, taken in connection with the fact that then the heat was developed in certain of the sleeves and that normally they grow on the inside and that there is a definite heat sink at the axis and top and bottom of the furnace, again proves my theory that the crystals grow towards a down temperature gradient.

Above the location of the middle block 64 in the container 66 is crucible 76 which holds lumps of silicon metal which is vaporized. The structure including the silicon which causes the heat to flow to the silicon constitutes what I call a heat sink and the hole in the graphite cover and chimney 72 lose heat to form what I consider to be a heat sink. This word of slang derivation means that the heat is escaping or being utilized at those locations. One feature of the process is having a heat sink above and below the cylindrical sleeves or plates where the crystals grow, with the axis of the heat sinks (in this case the axis of the container 66) parallel or nearly parallel to the faces of the graphite, in the case of FIGURE 3 parallel to elements of the cylindrical surfaces of the sleeves 88–96. This keeps the crystals growing horizontally with their faces horizontal and produces the best crystals.

Figure 5:
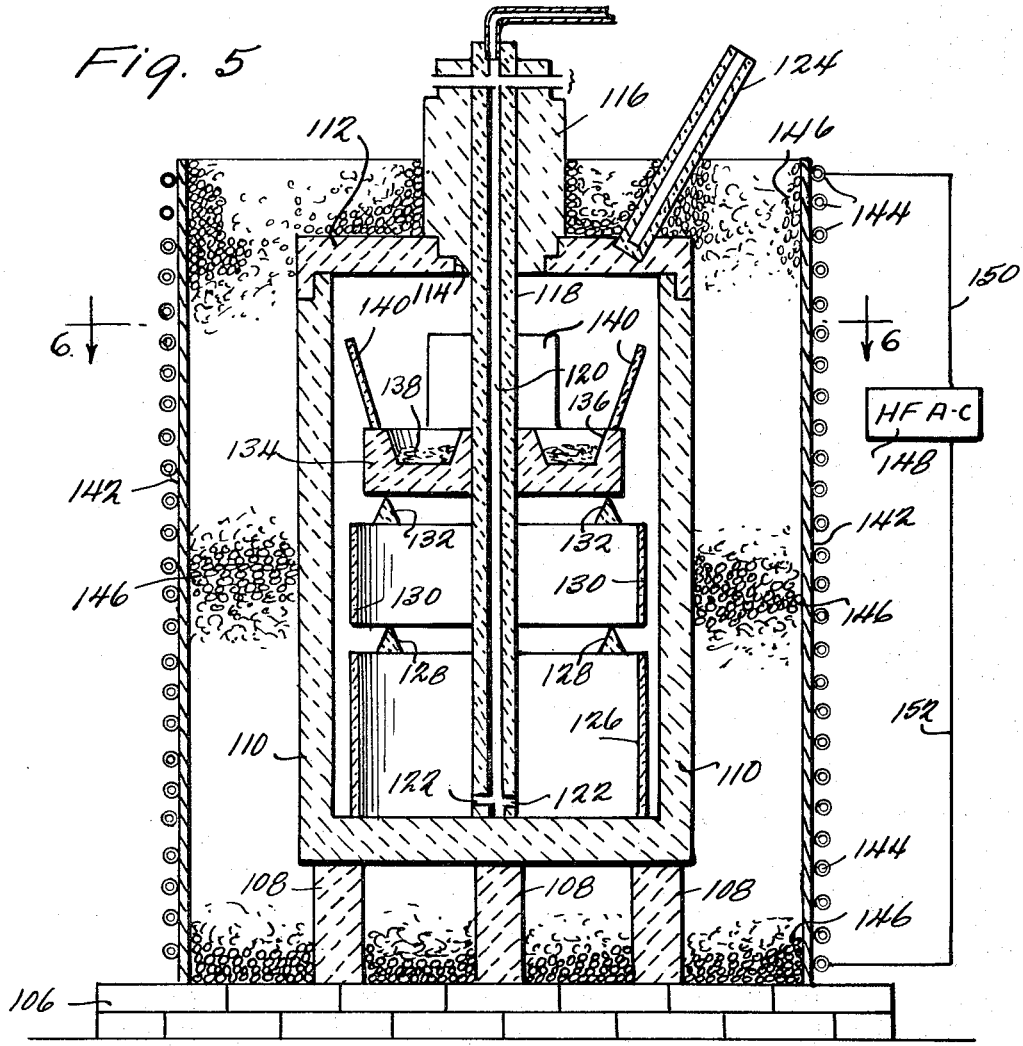
FIGURE 5 is a vertical sectional view of yet another furnace according to the invention.
Figure 6:
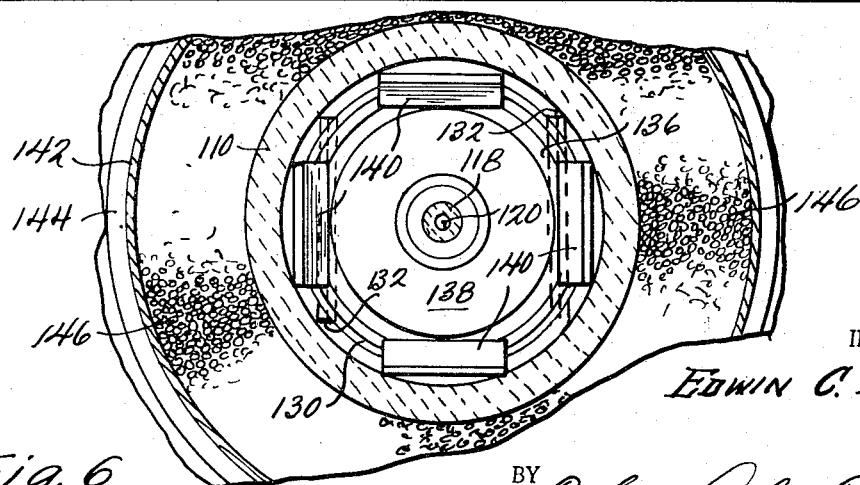
FIGURE 6 is a horizontal cross-sectional view taken on the line 6—6 of FIGURE 5.

Another embodiment of the instant invention is shown in FIGURES 5 and 6. A fire brick base 106 supports graphite blocks 108 which support a graphite container 110 having a graphite cover 112 with a central hole 114 the top of which is counterbored to receive a graphite chimney 116. Extending through a vertical axial bore in the chimney 116 is a graphite tube 118 having a fine vertical axial bore 120 which communicates with diametral bores 122 to lead any desired gas to the inside of the container 110 from which it escapes between the cover 112 and chimney 116 and between the chimney 116 and the tube 118 and between the cover 112 and the container 110, thus maintaining a flow of gas. A graphite tube 124, for making temperature measurements like the tube 54 of FIGURE 1 is provided.

A cylindrical graphite sleeve 126 rests upon the bottom of the container 110 coaxial with it and this supports graphite bars 128 which in turn support a cylindrical graphite sleeve 130. Sleeve 130 supports graphite bars 132 which in turn support a graphite crucible 134 of the same shape as the crucibles 30 and 50 of FIGURE 1, having an annular trough 136 into which is charged a quantity of silicon 138 in the form of lumps. Resting on the upper lip of the crucible 134 and against the inside wall of the container 110 are graphite plates 140. A cylindrical asbestos sleeve 142, a high frequency coil 144, and a mass of zirconia 146, completes the furnace of FIGURES 5 and 6.

The graphite plates 140 are plane surface plates. Such plates are cheaper than cylindrical sleeves which must be machined from large graphite bars and the plates are available in higher purity grades of graphite. In this embodiment the plates are placed in the furnace in such a way that the flow of heat is normal to the surfaces which is the case illustrated in FIGURE 5 since the hole 114 and the vaporizing silicon 138 are "heat sinks," the crystals grow down the temperature gradient, i.e. on the inside cooler face.

In operating the apparatus of FIGURES 5 and 6, some crystals were formed on the inside of the plates 140, but also a good many crystals were formed on the insides of the sleeves 126 and 130. The atmosphere of silicon moves all through the chamber formed by the container 110 to grow crystals wherever there is a downward heat gradient. As a guide to the sizes of various parts of FIGURES 5 and 6, the container 110 had an outside diameter of 24 inches.

In a successful run of the apparatus of FIGURES 5 and 6, seven pounds of silicon were charged into the crucible 134 and argon was supplied through the bore 120 at the rate of 8 litres per minute at the start when the power was turned on, reduced to 4 litres per minute when the temperature reached 1280° C. and maintained at that rate of flow. The argon had been purified so that it was practically free of all other gases and it was preheated to a temperature of 890° C. In two hours and fifteen minutes the temperature had reached 2060° C. as read through tube 124 by means of an optical pyrometer. In two hours and fifty minutes the temperature had reached 2400° C. The temperature was maintained at substantially this figure for four hours and forty-five minutes and then the power was turned off, but the argon was left flowing for eighteen more hours whereupon the furnace was opened.

Many large, about half inch size, blue crystals were recovered from the inside of the sleeves 126 and 130. Some crystals grew on the outside cylindrical wall of the crucible 134. Some grew on the outer wall of the trough 136. The crystals on the insides of the sleeves 126 and 130 extended from top to bottom thereof and all around. There were many hundreds of these. From top to bottom of the plates 140 crystals grew on the inner faces. There were many hundreds of these. The crystals collected from the plates were smaller than those collected from the sleeves. Although many of the crystals were green, there were also grey crystals, blue crystals and yellow crystals and some which were almost colorless.

I estimated that the number of large crystals, half an inch across and over, collected in this run was 500 to 700. I estimated that the number of crystals, $\frac{3}{8}''$ to $\frac{1}{2}''$ across, collected in this run was about 1000. I estimated that the number of crystals $\frac{3}{16}''$ to $\frac{3}{8}''$ collected in this run was about 1000 to 1500. Some crystals from these and other similar runs were tested individually for resistivity. About 14% of those tested had resistivity within the range of 0.01 ohm cm., about 18% of those tested had resistivity within the range of 0.1 ohm cm. to 1.0. ohm cm. about 14% of those tested had resistivity within the range of 1.0 ohm cm. to 10 ohms cm. and about 54% of those tested had resistivity over 10 ohms cm. but well below 1000 ohms cm. These are very useful ranges for certain purposes. All of these crystals, and presumably all of those produced during these runs where argon was introduced into the furnace but no other gas, had n-type conductivity due to the small amount of nitrogen remaining and diffusing into the furnace. The crystals had faces that were parallel to each other with no more than about 1° deviation from parallelism, when discontinuities are allowed for, that may occur at their point of attachment to the piece of carbon upon which they were grown. I have examined many commercial lots of silicon carbide made for grain purposes and I have never seen any crystals selected from silicon carbide lots or from any other source that come anywhere near meeting this parallelism description.

The resistivity measurements were made by placing the silicon carbide crystal to be tested on a non-conducting surface and pressing four hard steel probes arranged in a straight line against the crystal under the pressure of small individual springs. Direct current was led into and out of the crystal with the two end probes and voltage measurements were taken between the two center probes. The applied D.C. voltage was adjusted to produce a few milliamperes of current through the crystal and this current was accurately measured with a milliameter. The voltage measurement between the center probes was made with a vacuum tube voltmeter with very high input impedance of the order of $10^{12}$ ohms. A correction was applied to the results to compensate for the geometry of each crystal being measured, according to computation formulas well known to those skilled in the art. The measurements were all made at room temperature, and the resistivity figures quoted all correspond to this temperature.

The cylindrical walls of the containers 14, 66 and 110 of the furnaces shown in FIGURES 1, 3 and 5 respectively can be called a peripheral wall and it is this which receives the electrical energy to produce the heat. These walls and the sleeves 38, 88–96, 126 and 130, the bars 28, 36, 42, 46, 48, 74, 82 and 84, 128 and 132 and the plates 44 and 140 can all be made out of amorphous carbon as well as out of graphite and the generic name for these two substances is simply carbon. The crucibles 30, 52, 76 and 134 can be made out of amorphous carbon as well as out of graphite.

The atmosphere for the process so that the resistivity will drop below 0.1 ohm cm. which is desired should be not more than about 1 mol percent of $N_2$. So long as a particular run is continued, there will be free carbon in the furnace and the amount of oxygen will therefore be practically negligible. While hydrogen attacks the graphite to some extent, it can be used as a protective gas. As a protective gas I prefer the inert gases, especially argon and helium, of which the former is preferred. Carbon monoxide can also be used. The atmosphere is therefore one containing not more than about 1 mol percent of nitrogen, substantially no oxygen and the remainder a protective gas selected from the group: hydrogen, carbon monoxide and the inert gases and mixtures thereof. Since one gram molecular weight of all gases occupies the same volume, mol percents are the same as volume percents for gases.

The temperature to which to heat the piece of carbon upon which the crystals are to be grown is between about 2300° C. and about 2500° C. The downward temperature gradient should preferably extend in a generally normal direction away from the surface of said piece of carbon. In the apparatus I have described the heat flows axially inwardly from the container wall and there is another temperature gradient in a general direction perpendicular thereto as previously explained. There were thus in effect two heat sinks used to produce temperature gradients in the process and apparatus that I have described.

The bottom wall of each of the containers 14, 66 and 110, is a closure. The covers 16, 68 and 112 are also closures although the holes 18 and 70 and chimneys 20 and 72 of FIGURES 1 and 3 respectively make these closures incomplete. Nevertheless it is contemplated that inert gas will be used in sufficient quantity to provide a doping agent for the crystals to produce a resistivity of at least .1 ohm cm. so that even in FIGURES 1 and 3 there is closure means co-operating with the peripheral wall to form a generally sealed chamber.

The zirconia 60, 104 and 146 constitute thermal insulation outside of and surrounding the peripheral walls of the chamber. The coils 58, 102 and 144 are primary coils around the thermal insulation coaxial with the peripheral wall. In FIGURES 1, 3 and 5 a source of high frequency A.C. electrical energy 148 is connected by leads 150 and, this electrical circuitry is diagrammatically shown. The peripheral walls of graphite of the respective chambers are the secondaries to the primary coils 58, 102 and 144 and when current flows in the associated primary coil, the electrical energy is converted to heat in the secondary element.

It is sufficient for some purposes if the silicon carbide crystals have a dimension in the direction perpendicular to the bisector of the 120° angle of at least ⅛ of an inch. However, for many uses it is better that this dimension be at least ¼ of an inch. Many crystals are wanted which have this dimension as great as ½ an inch. As to thickness, I have made crystals as stated from 1 mil to 100 mils thick. My process and furnace will upon occasion produce crystals as thin as ½ a mil.

I have tried to measure the temperature gradients in the furnaces but without success. At the temperatures involved, small differences are quite difficult to measure. However, I am confident that the decreasing temperature gradient extending in a radial direction from the vertical axis of the furnace extends for a distance at least equal to the maximum dimension of the largest crystal to be formed, which is often at least ½", and another temperature gradient, which, with the apparatus I have used, is a vertical temperature gradient and extends for a distance of at least 5" in most cases.

In order to produce silicon carbide crystals having both n-type and p-type conductivity in different parts thereof with a p-n junction between them, I provide first an atmosphere containing a doping agent which has an electron donor constituent and later an atmosphere which has an electron acceptor constituent, or vice versa.

I claim:

1. Apparatus for the production of hexagonal silicon carbide crystals, said crystals having parallel faces, comprising a chamber having a peripheral wall of graphite, said chamber having a longitudinal axis, closure means for said chamber, thermal insulation outside of and surrounding said chamber, a heat source surrounding and effecting heating of said peripheral wall to a temperature in the order of about 2300° C. to 2500° C., a source of silicon vapor within the chamber, means providing a carbon surface in said chamber that receives heat by radiation from said wall, and being in the form of a plurality of spaced concentrically arranged cylinders formed of carbon, said carbon surface being disposed relative to the peripheral wall and to one side of and generally parallel to said axis to be heated more on one side of the surface than the other to produce hotter and cooler sides on the opposite faces of the surface, heat sink means disposed to receive heat flowing from the cooler side of said surface and promote heat flow from the space between said cooler side and the axis in a direction generally parallel to the axis, and means to provide a gaseous atmosphere in the chambers.

2. Apparatus for the production of hexagonal silicon carbide crystals, said crystals having parallel faces, comprising a chamber having a peripheral wall of graphite, said chamber having a longitudinal axis, closure means for said chamber, thermal insulation outside of and surrounding said chamber, a heat source surrounding and effecting heating of said peripheral wall to a temperature in the order of about 2300° C. to 2500° C., a source of silicon vapor within the chamber, means providing a carbon surface in said chamber that receives heat by radiation from said wall and being in the form of a flat block having a plane surface disposed in the furnace, said plane surface being arranged to face toward said axis whereby the heat flow from said surface is normal thereto, said carbon surface being disposed relative to the peripheral wall and to one side of and generally parallel to said axis to be heated more on one side of the surface than the other to produce hotter and cooler sides on the opposite faces of the surface, heat sink means disposed to receive heat flowing from the cooler side of said surface and promote heat flow from the space between said cooler side and the axis in a direction generally parallel to the axis, and means to provide a gaseous atmosphere in the chamber.

References Cited

UNITED STATES PATENTS 2,178,773 11/1939 Benner et al. _____ 23—208
2,677,627 5/1954 Montgomery et al. __ 117—106

MORRIS O. WOLK, *Primary Examiner.*

JOSEPH SCOVRONEK, *Assistant Examiner.*